United States Patent
Vandervelde et al.

(10) Patent No.: US 11,419,040 B2
(45) Date of Patent: Aug. 16, 2022

(54) APPARATUS AND METHOD FOR TRANSMITTING AND RECEIVING SYSTEM INFORMATION IN WIRELESS COMMUNICATION SYSTEM

(71) Applicant: Samsung Electronics Co., Ltd, Suwon-si (KR)

(72) Inventors: Himke Vandervelde, Middlesex (GB); Mangesh Abhimanyu Ingale, Bangalore (IN); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/638,102

(22) PCT Filed: Aug. 9, 2018

(86) PCT No.: PCT/KR2018/009075
§ 371 (c)(1),
(2) Date: Feb. 10, 2020

(87) PCT Pub. No.: WO2019/031863
PCT Pub. Date: Feb. 14, 2019

(65) Prior Publication Data
US 2020/0260364 A1 Aug. 13, 2020

(30) Foreign Application Priority Data

Aug. 9, 2017 (IN) .............................. 201731028258
Aug. 6, 2018 (GB) ..................................... 1812743

(51) Int. Cl.
| | | |
|---|---|---|
| H04W 48/12 | (2009.01) | |
| H04W 36/00 | (2009.01) | |
| H04W 36/08 | (2009.01) | |
| H04W 48/10 | (2009.01) | |
| H04W 72/12 | (2009.01) | |

(52) U.S. Cl.
CPC ....... *H04W 48/12* (2013.01); *H04W 36/0077* (2013.01); *H04W 36/08* (2013.01); *H04W 48/10* (2013.01); *H04W 72/1278* (2013.01)

(58) Field of Classification Search
CPC ... H04W 48/12; H04W 74/006; H04W 48/16; H04W 36/08; H04W 36/0083;
(Continued)

(56) References Cited

U.S. PATENT DOCUMENTS 9,763,187 B1 * 9/2017 Govindassamy ..... H04W 48/12
10,959,207 B2 * 3/2021 Ishii ....................... H04W 48/12
(Continued)

FOREIGN PATENT DOCUMENTS

| | | |
|---|---|---|
| EP | 3567933 A1 | 11/2019 |
| WO | 2007/127950 A1 | 11/2007 |
| WO | 2019/012430 A1 | 1/2019 |

OTHER PUBLICATIONS

Panasonic, "Relation among NR-PBCH, SIBs and subcells", 3GPP TSG RAN WG1 NR Ad-Hoc #2, Jun. 27-30, 2017, R1-1711319, 4 pages.
(Continued)

*Primary Examiner* — Allahyar Kasraian

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for operating a user equipment (UE) in a wireless communication system is provided. The method includes receiving system information blocks (SIBs) of a first base station, performing a procedure for accessing a second base station that receives, from the first base station, information to be used to identify at least one SIB to be provided to the UE, and receiving the at least one SIB of the second base station.

14 Claims, 14 Drawing Sheets

(58) Field of Classification Search
CPC ............... H04W 48/20; H04W 72/042; H04W 72/1289; H04W 48/10; H04W 72/1278; H04W 36/0055; H04W 36/0061; H04W 36/0016; H04W 36/14; H04L 5/14
See application file for complete search history.

(56) References Cited

U.S. PATENT DOCUMENTS

| | | | |
|---|---|---|---|
| 2008/0253332 A1* | 10/2008 | Ore | H04W 48/20 370/331 |
| 2011/0105158 A1 | 5/2011 | Arora et al. | |
| 2012/0314606 A1 | 12/2012 | Takano | |
| 2013/0231114 A1* | 9/2013 | Jayanthi | H04W 64/00 455/436 |
| 2014/0051447 A1* | 2/2014 | Li | H04W 36/00835 455/437 |
| 2015/0195774 A1* | 7/2015 | Lee | H04W 36/0077 370/312 |
| 2016/0219566 A1* | 7/2016 | Jung | H04W 72/048 |
| 2016/0234735 A1 | 8/2016 | Kubota et al. | |
| 2016/0278150 A1* | 9/2016 | Jung | H04W 8/005 |
| 2019/0045379 A1* | 2/2019 | Ishii | H04W 48/10 |
| 2019/0059031 A1* | 2/2019 | Hahn | H04W 36/30 |
| 2019/0182764 A1* | 6/2019 | Nader | H04W 48/12 |
| 2019/0342824 A1* | 11/2019 | Futaki | H04W 76/15 |
| 2020/0205047 A1* | 6/2020 | Bergqvist | H04W 36/08 |

OTHER PUBLICATIONS

InterDigital Inc., "On Minimum System Information Delivery", 3GPP TSG RAN WG1 NR AH#2, Jun. 27-30, 2017, R1-1710919, 6 pages.

ETRI, "Delivery of remaining minimum system information", 3GPP TSG RAN WG1 NR Ad-Hoc #2, Jun. 27-30, 2017, R1-1710608, 3 pages.

Nokia et al., "On Remaining System Information Delivery", 3GPP TSG-RAN WG1 NR Ad-Hoc #2, Jun. 27-30, 2017, R1-1711267, 5 pages.

International Search Report dated Nov. 13, 2018 in connection with International Patent Application No. PCT/KR2018/009075, 3 pages.

Written Opinion of the International Searching Authority dated Nov. 13, 2018 in connection with International Patent Application No. PCT/KR2018/009075, 5 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 v15.8.0 (Dec. 2019), 964 pages.

"3rd Generation Partnership Project; Technical Specification Group Radio Access Network; NR; Radio Resouice Control (RRC) protocol specification (Release 15)", 3GPP TS 38.331 V15.8.0 (Dec. 2019), 532 pages.

"RAN1 Chairman's Notes", 3GPP TSG RAN WG1 Meeting 90bis, Oct. 9-13, 2017, 111 pages.

Combined Search and Examination Report under Sections 17 & 18(3) dated Feb. 5, 2019 in connection with United Kingdom Patent Application No. GB1812743.1, 4 pages.

MediaTek Inc., "Stored Sysem Information for OSI", 3GPP TSG-RAN2 NR Ad Hoc Meeting, Jan. 17-19, 2017, R2-1700269, 5 pages.

Examination Report under Section 18(3) dated May 1, 2020 in connection with United Kingdom Patent Application No. GB1812743. 1, 3 pages.

Search and Examination Report under Section 17 & 18(3) dated Dec. 9, 2020 in connection with United Kingdom Patent Application No. GB1812743.1, 4 pages.

* cited by examiner

[Fig. 1]
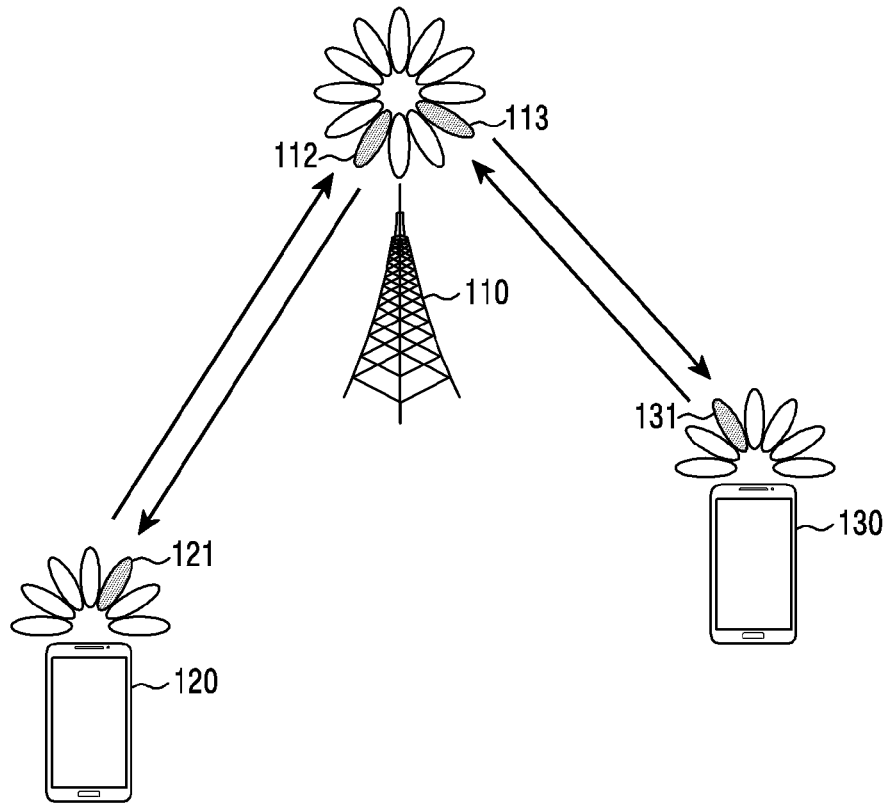
[Fig. 2]
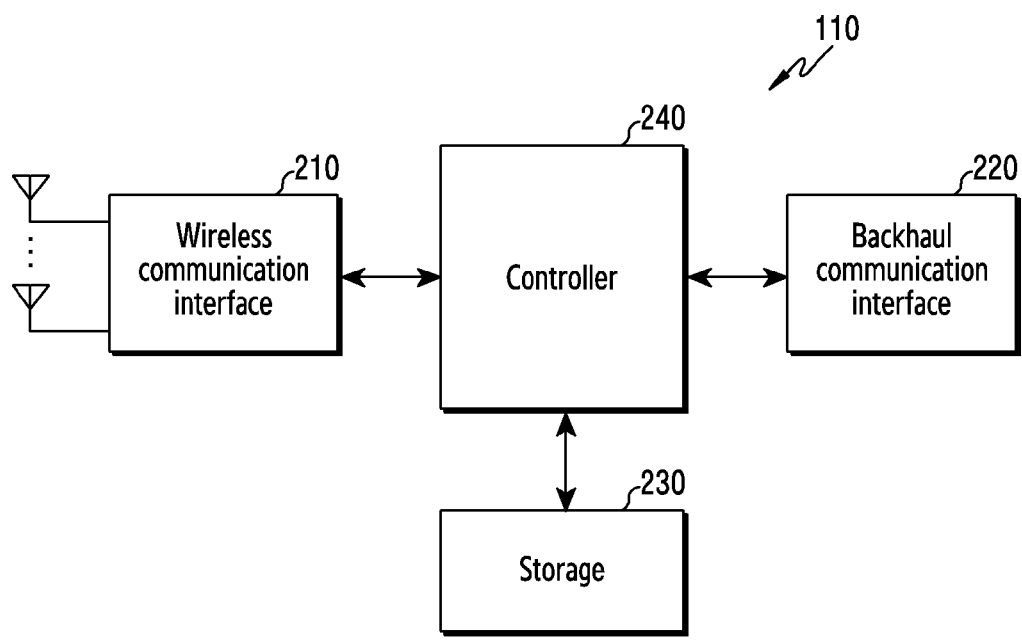

[Fig. 3]
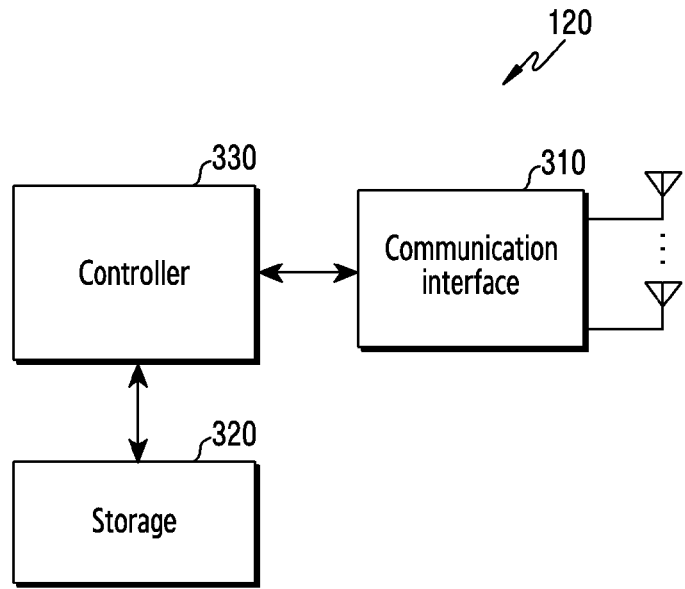
[Fig. 4]
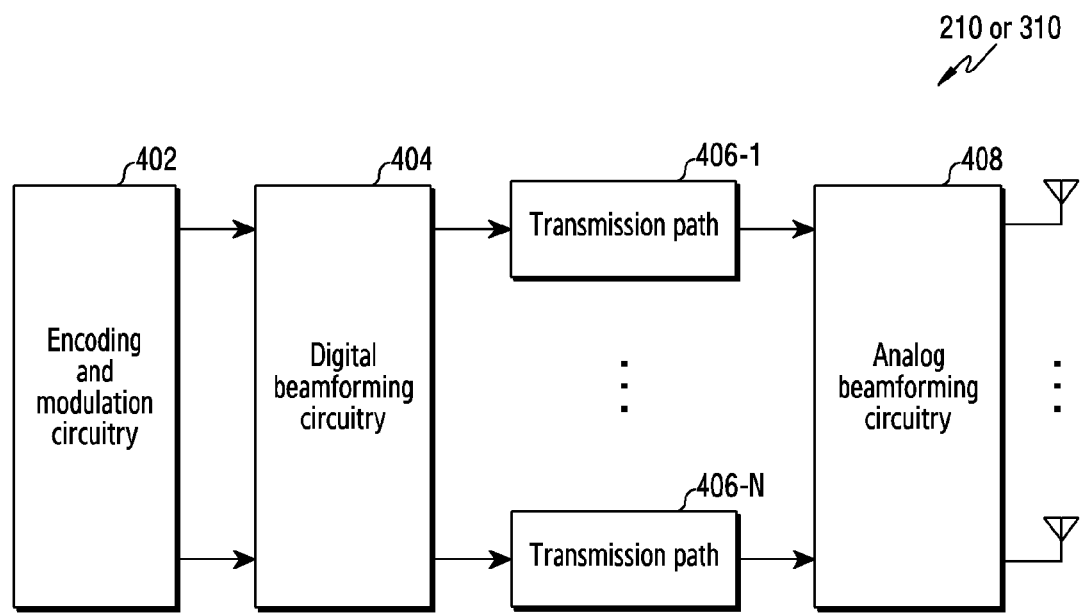

[Fig. 5A]
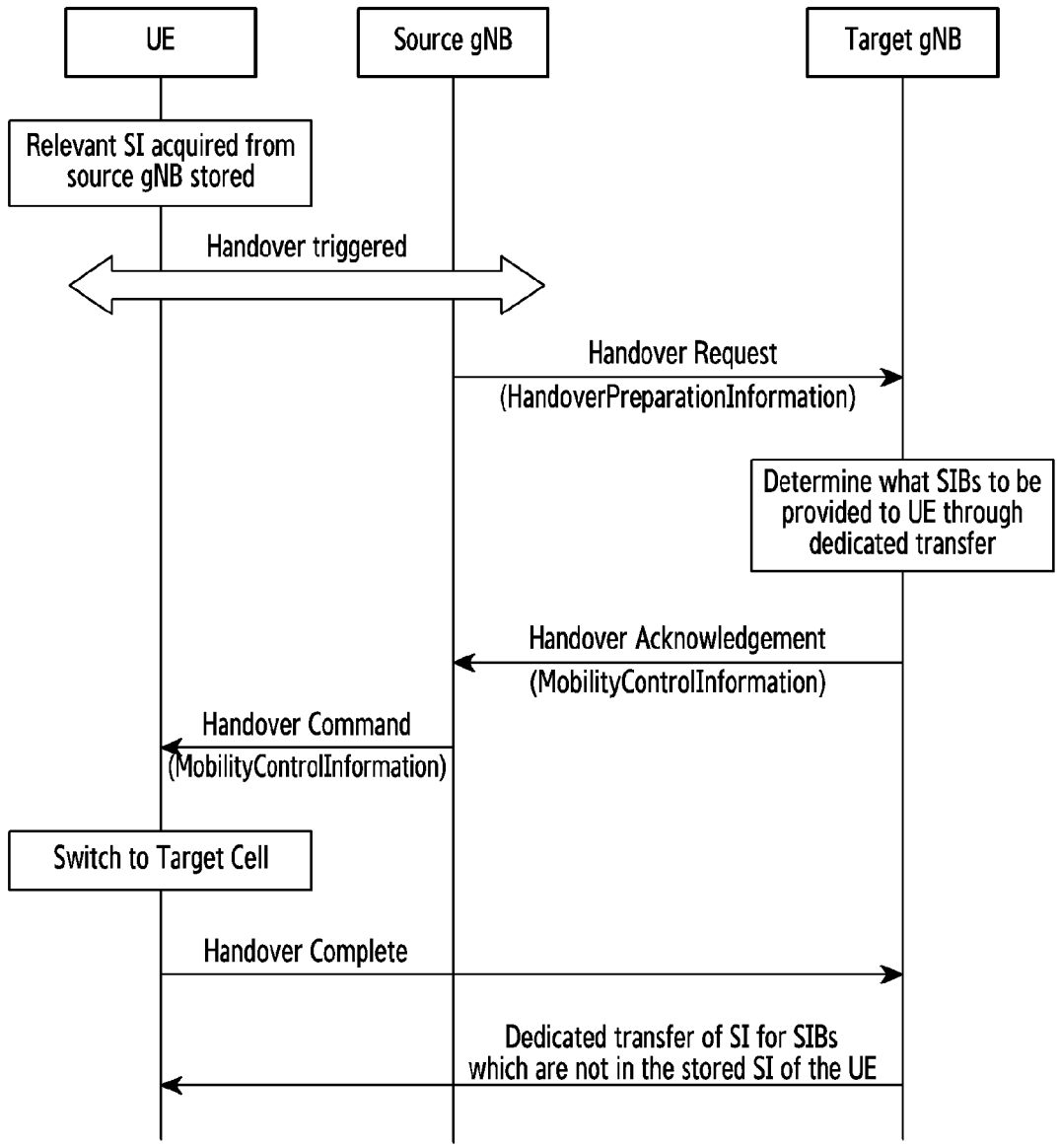

[Fig. 5B]
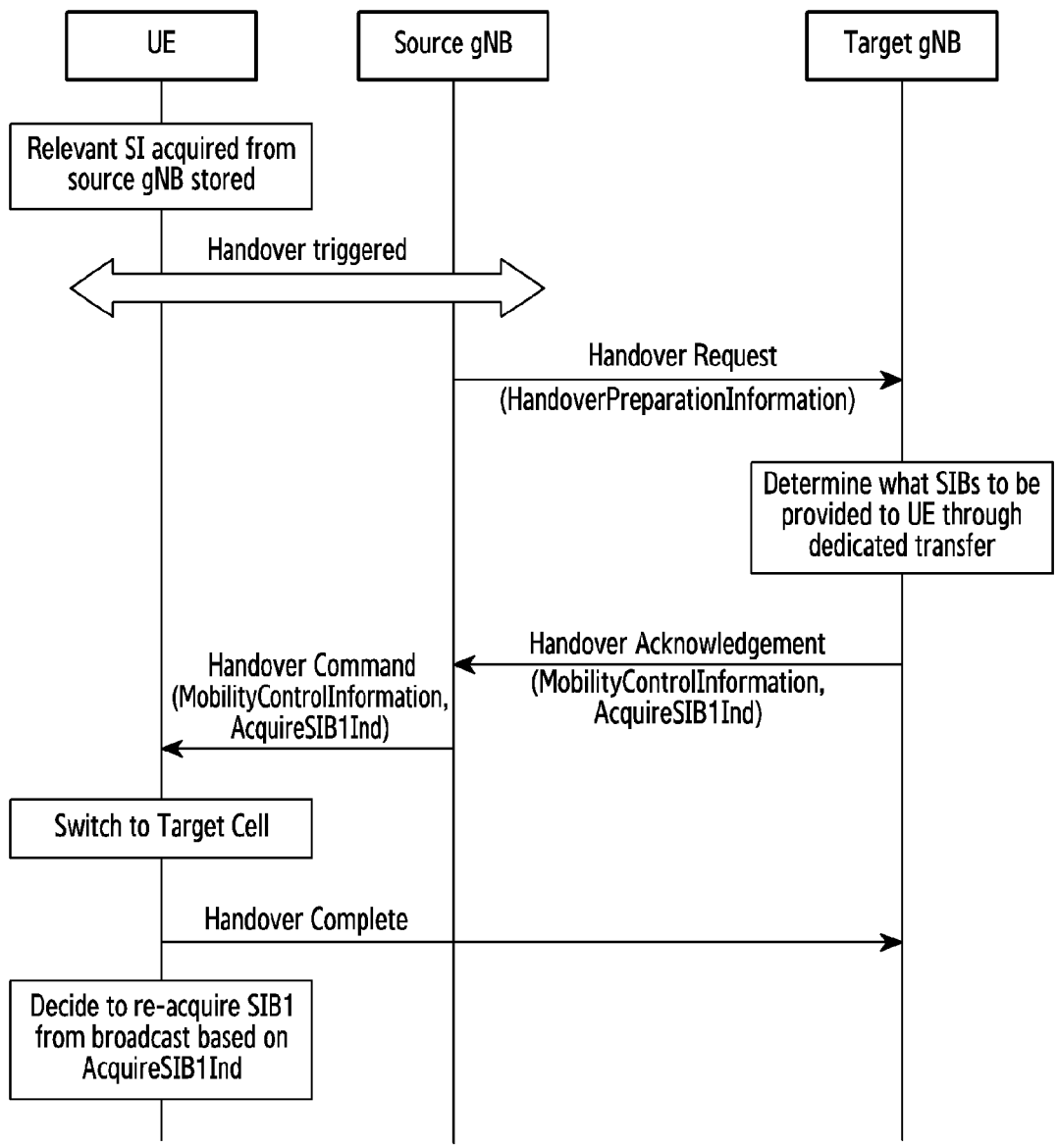

[Fig. 6]
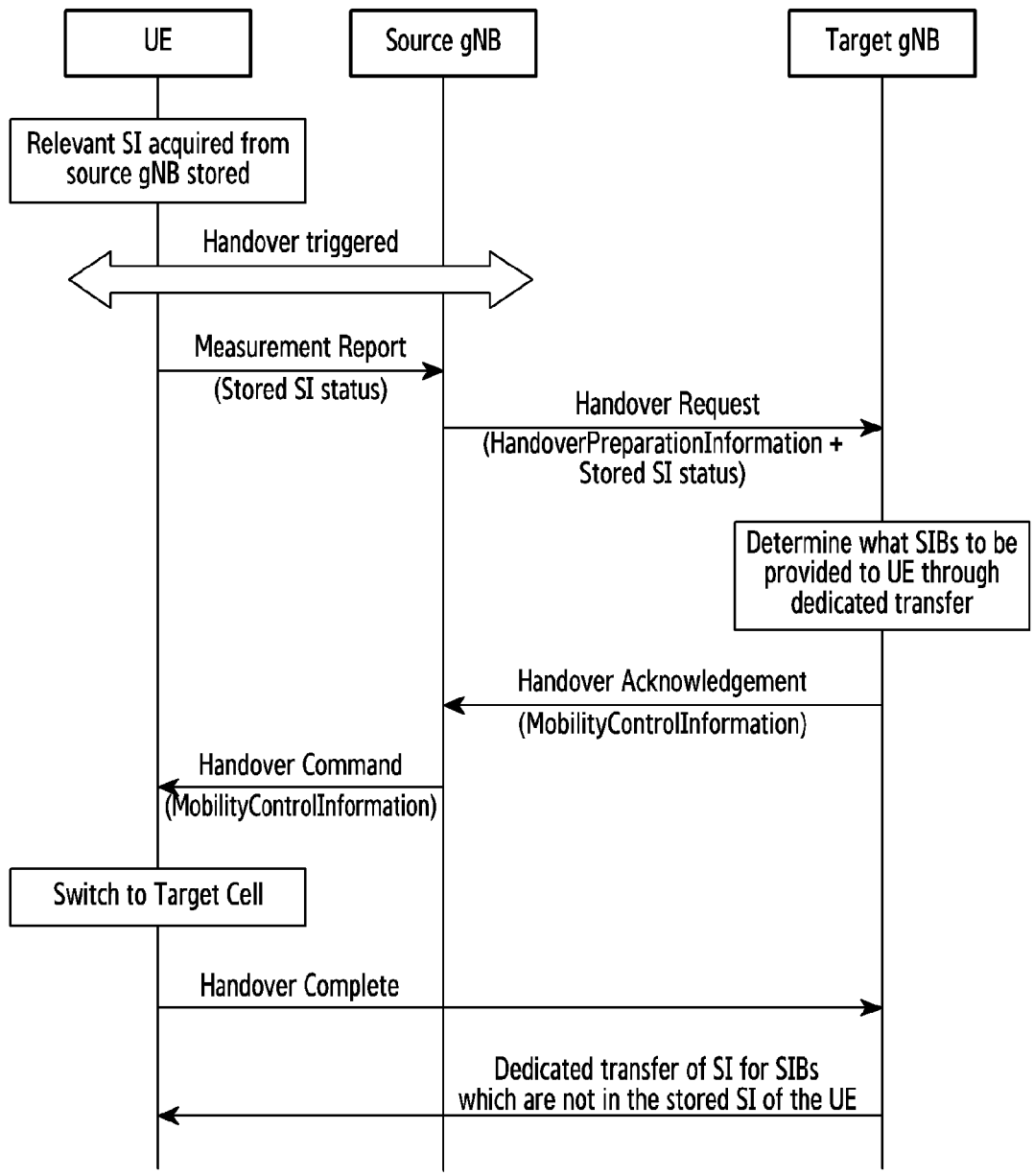

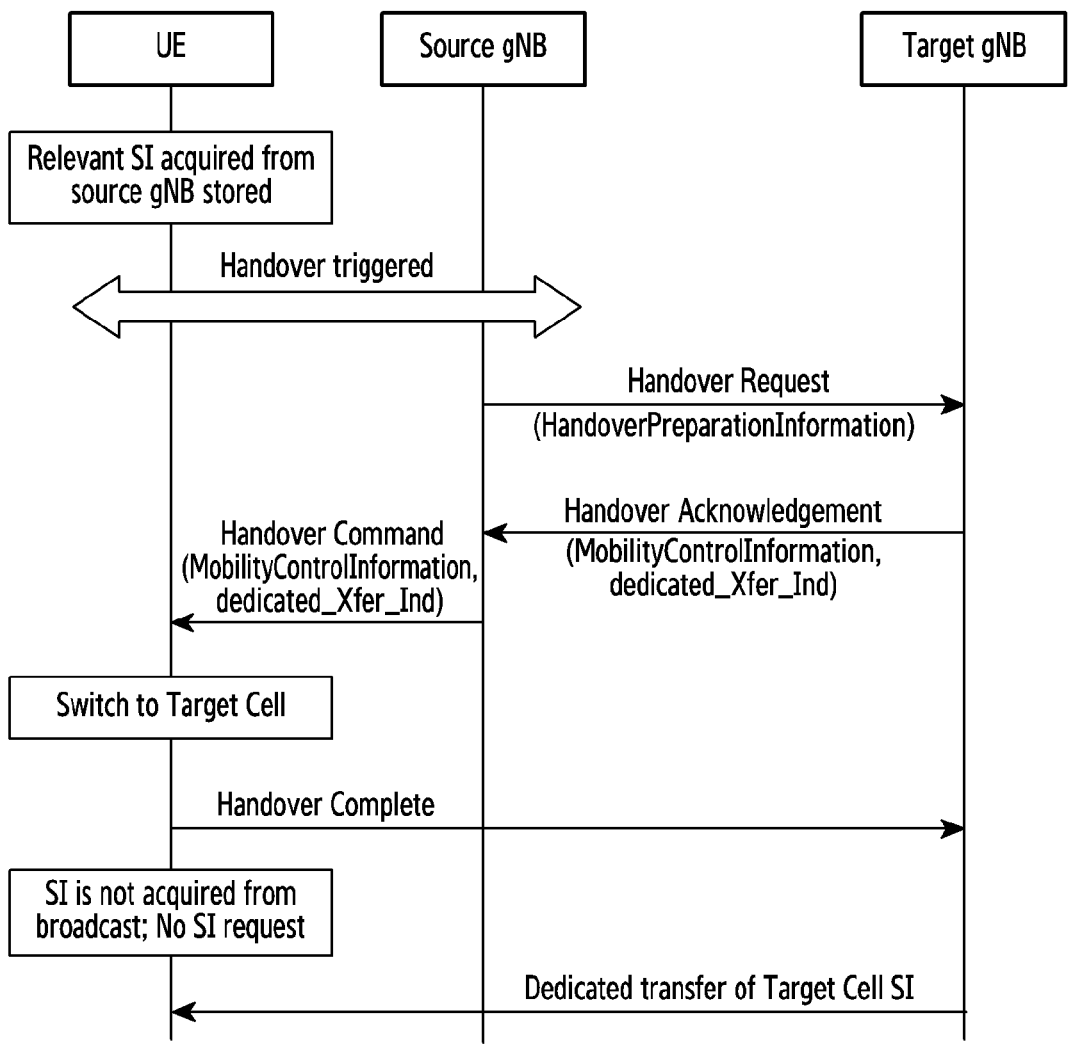
[Fig. 7A]

[Fig. 7B]
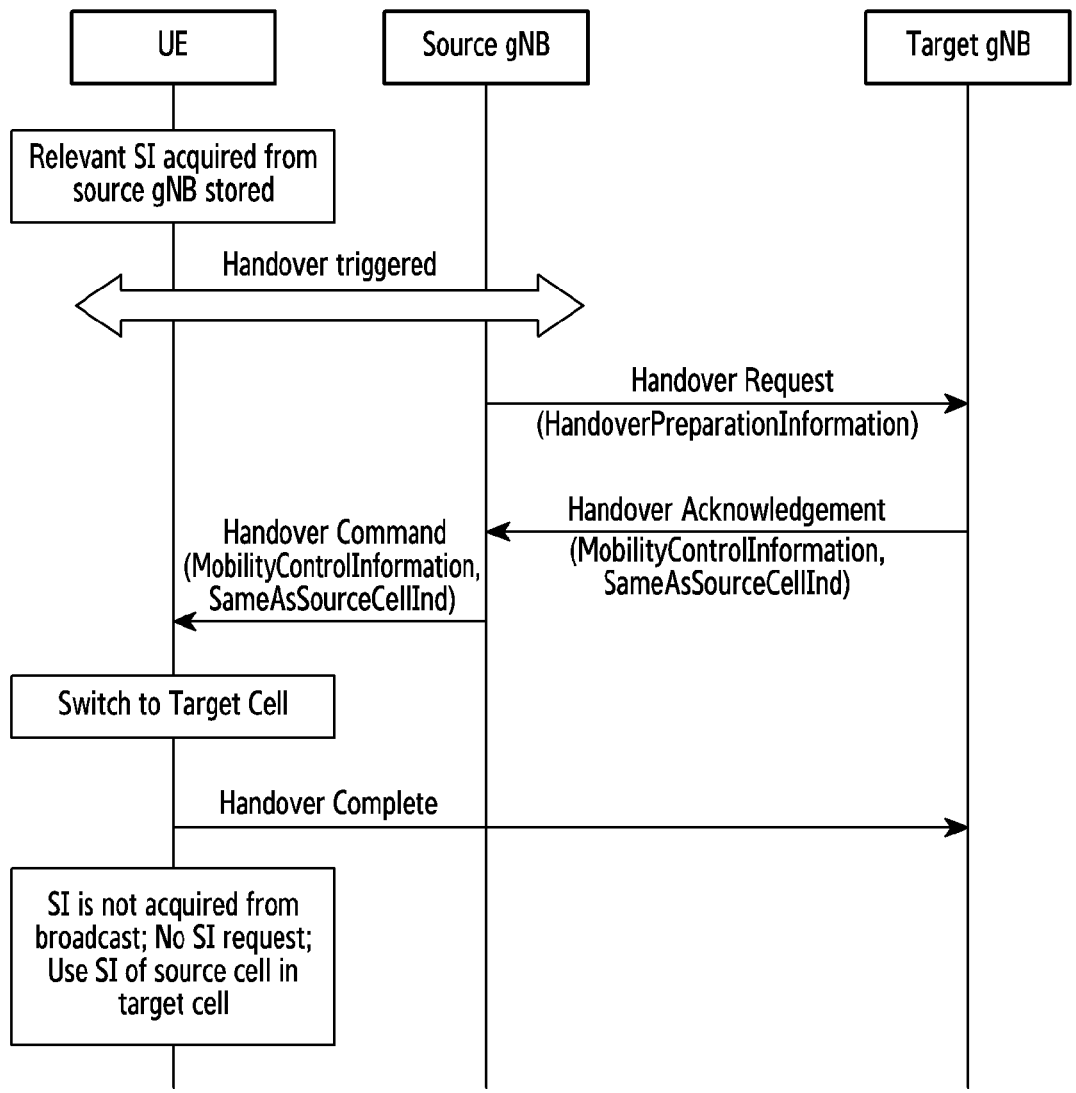

[Fig. 8]
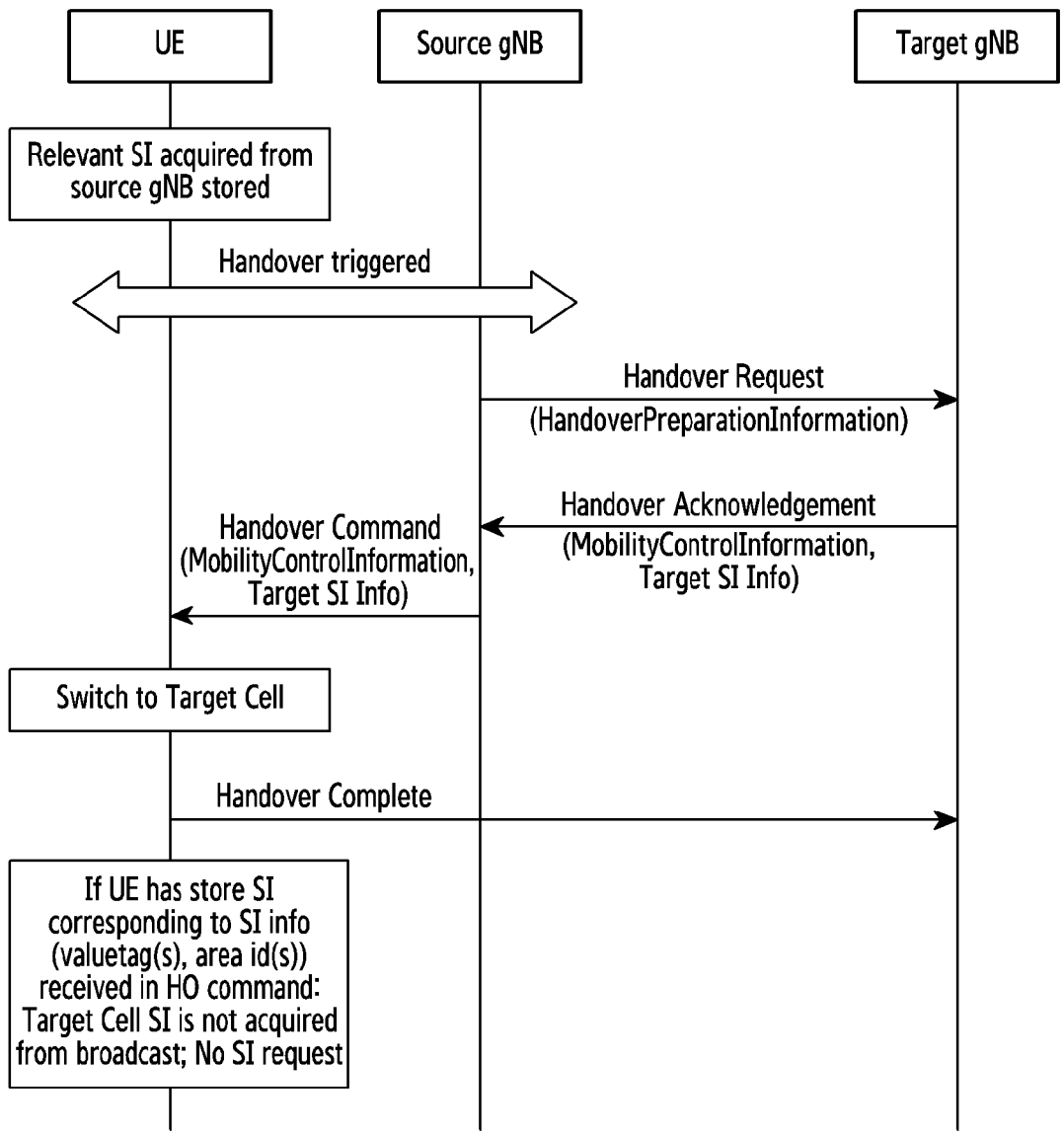

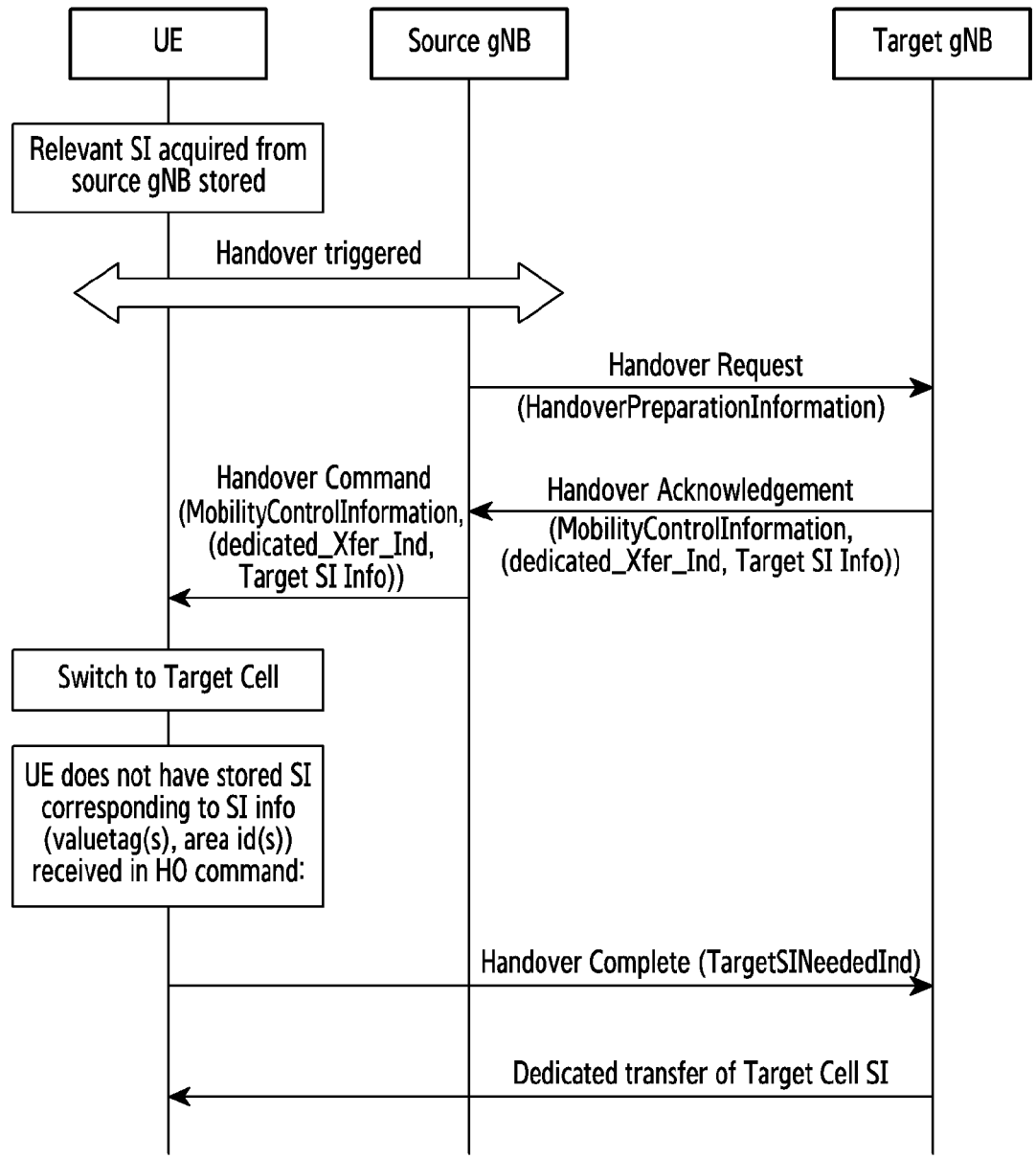
[Fig. 9A]

[Fig. 9B]
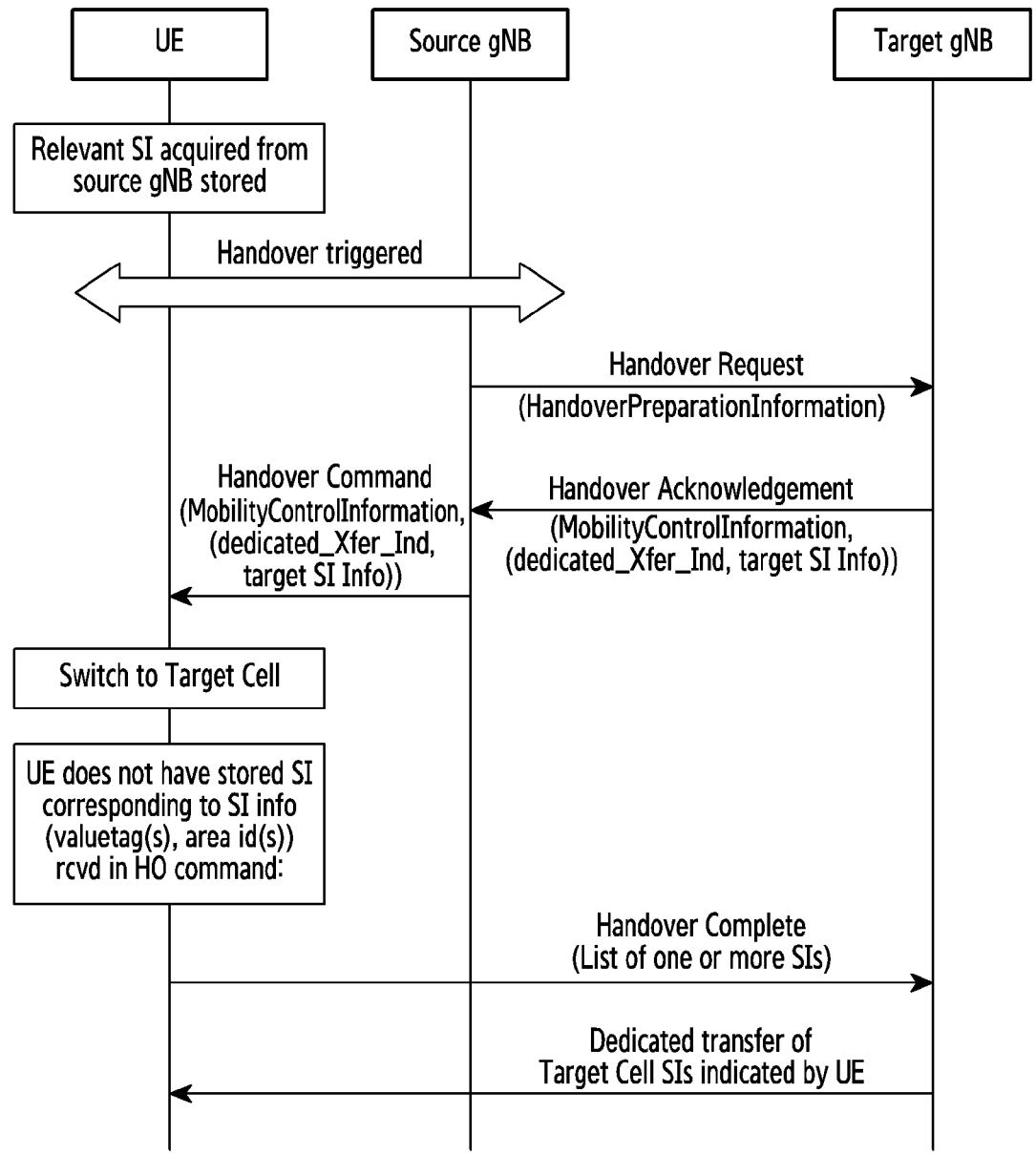

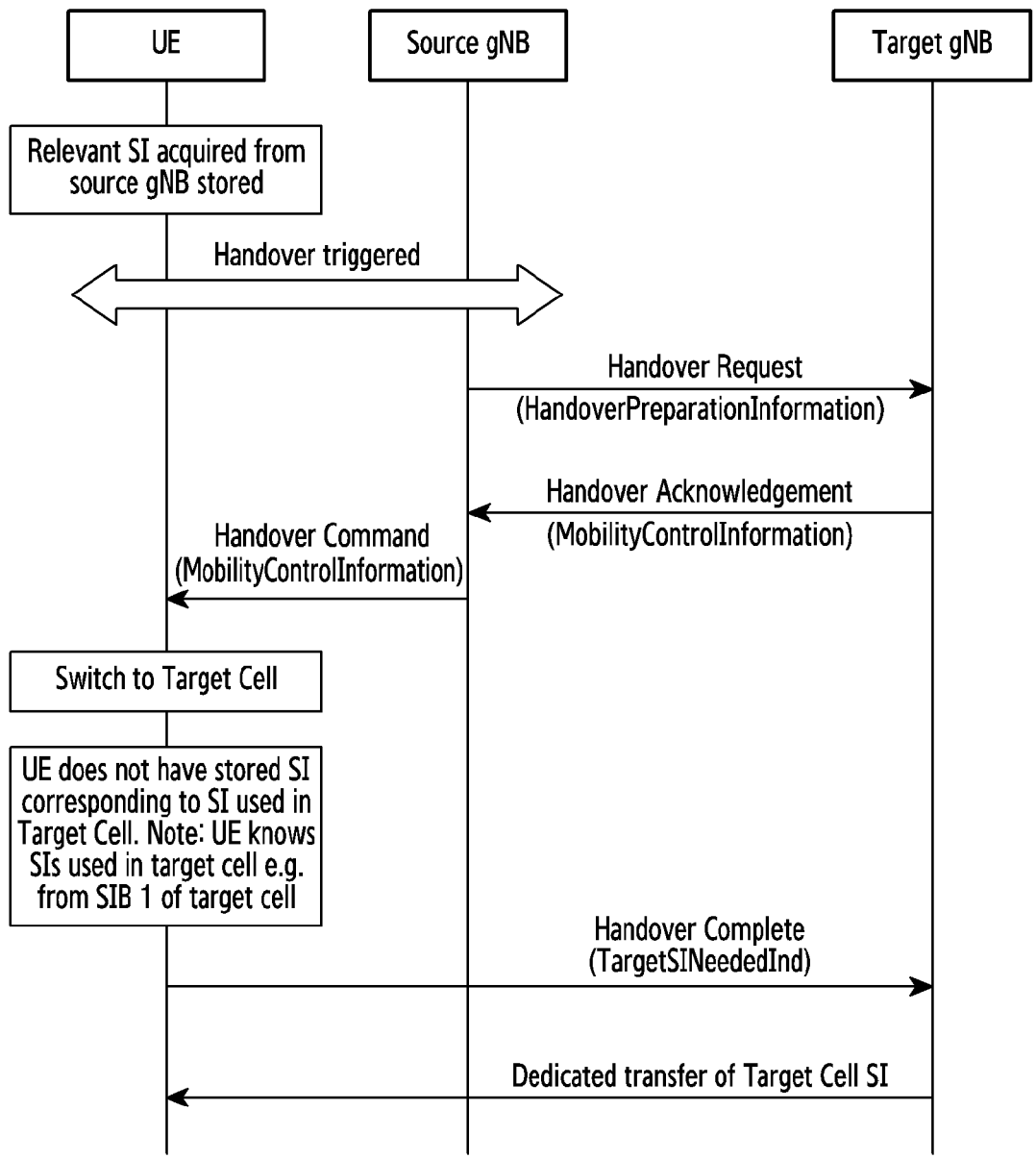
[Fig. 9C]

[Fig. 10]
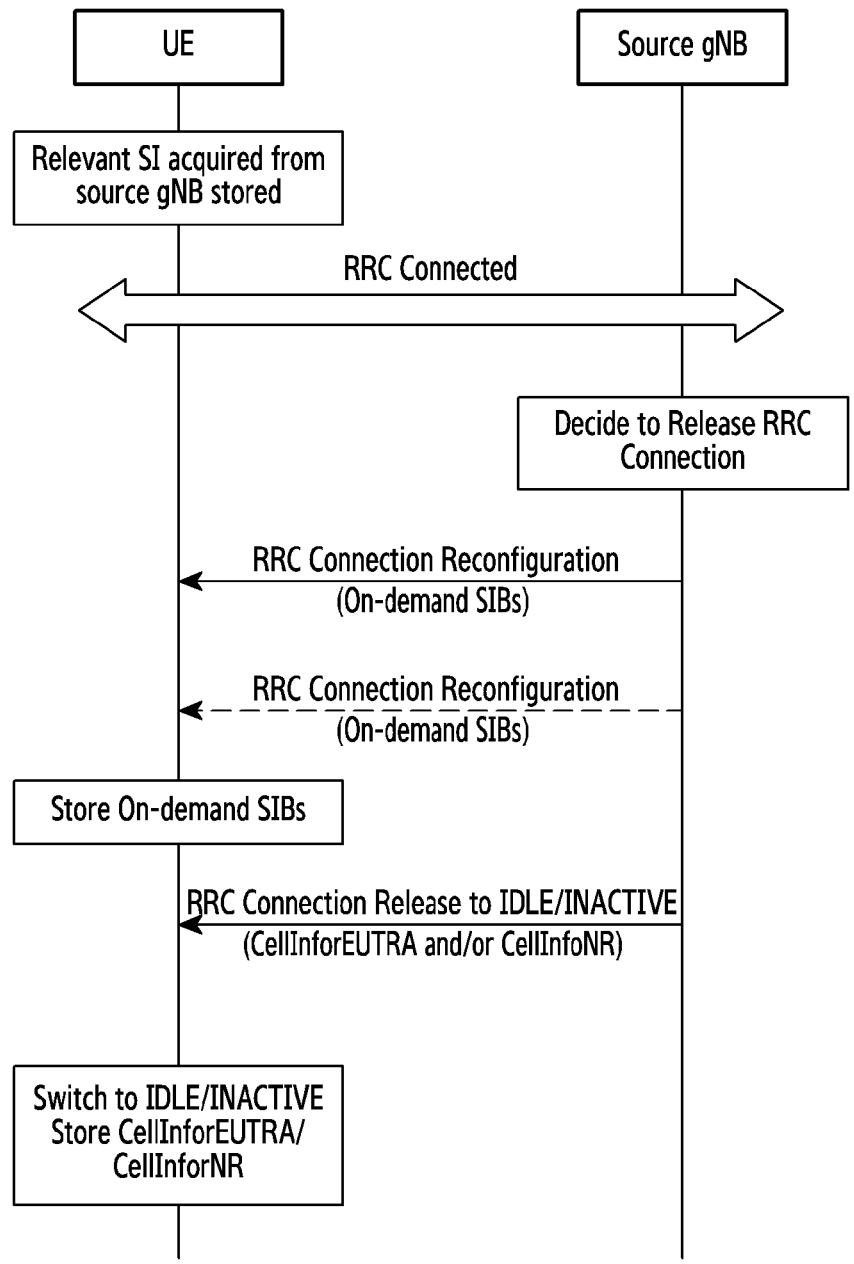

[Fig. 11]
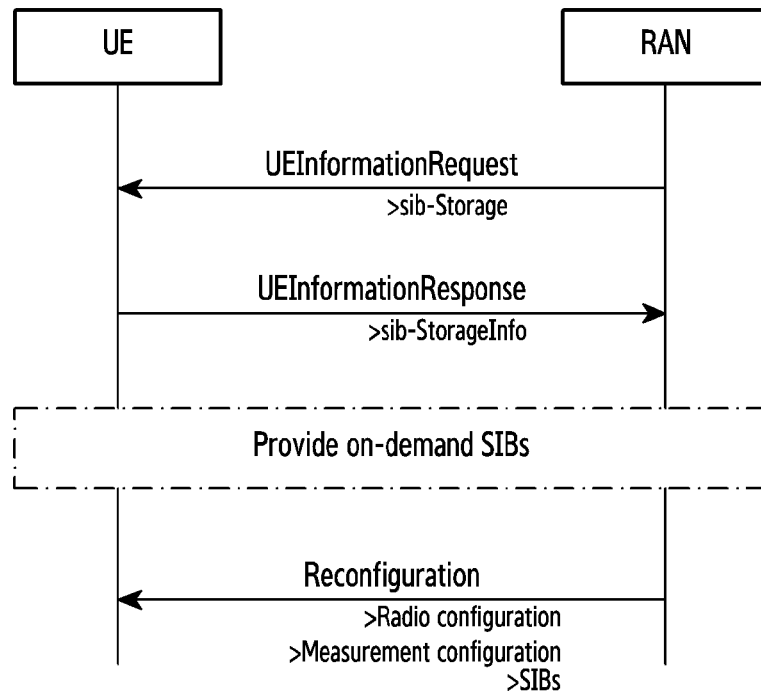
[Fig. 12]
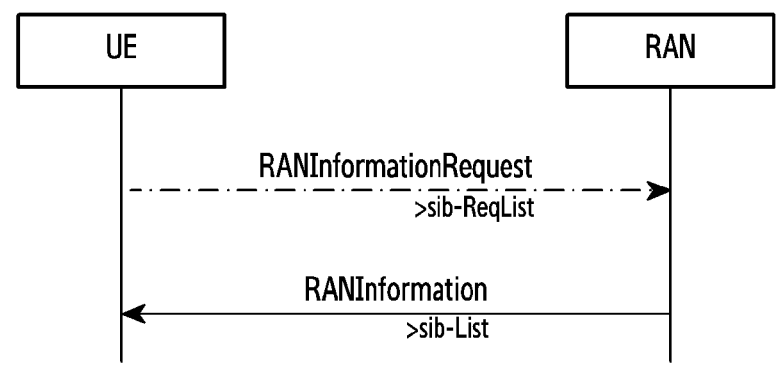

[Fig. 13]
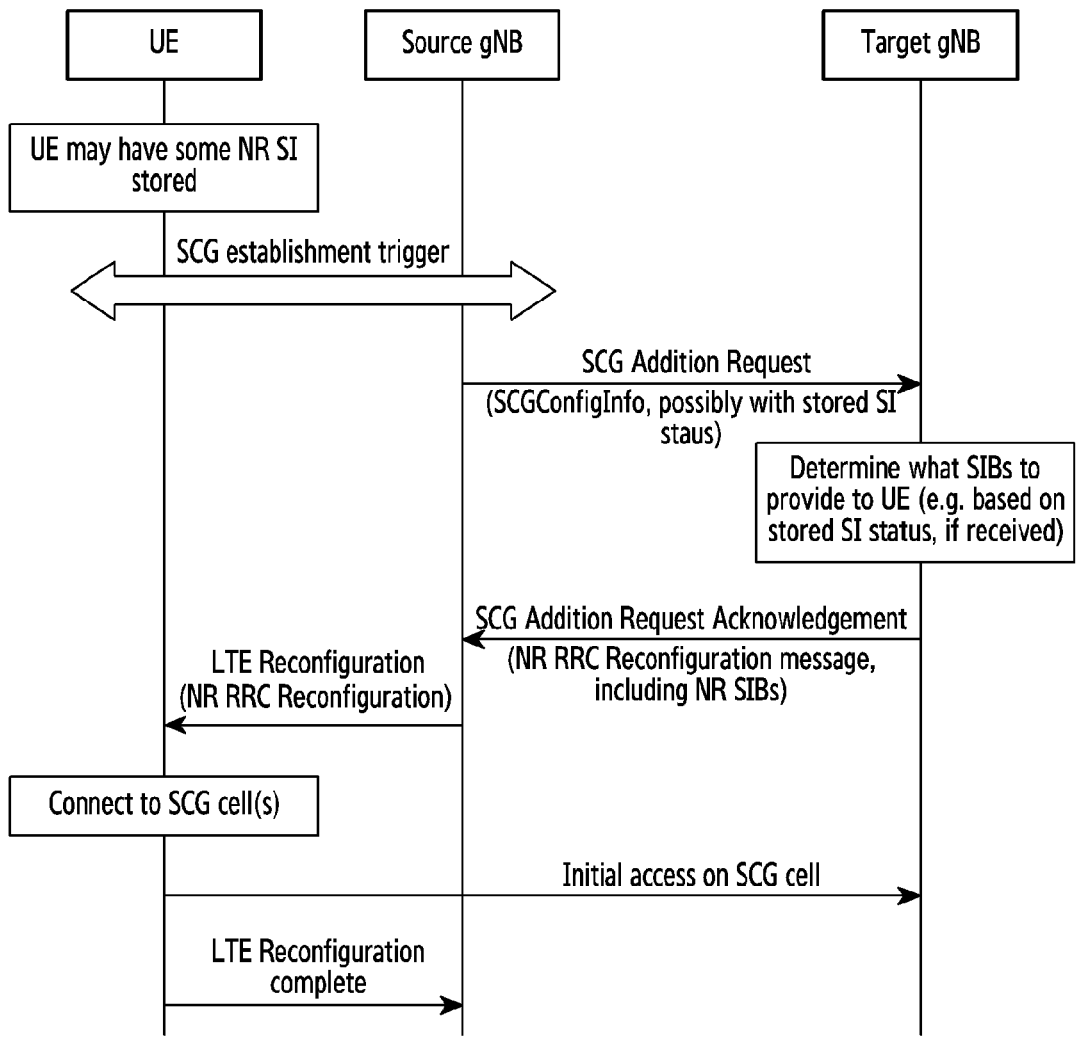

APPARATUS AND METHOD FOR TRANSMITTING AND RECEIVING SYSTEM INFORMATION IN WIRELESS COMMUNICATION SYSTEM

CROSS-REFERENCE TO RELATED APPLICATIONS

This application is a 371 of International Application No. PCT/KR2018/009075 filed on Aug. 9, 2018, which claims priority to India Patent Application No. 201731028258 filed on Aug. 9, 2017, and United Kingdom Patent Application No. 1812743.1 filed on Aug. 6, 2018, the disclosures of which are herein incorporated by reference in their entirety.

BACKGROUND

1. Field

The present disclosure relates generally to a wireless communication system, more particularly, transmitting and receiving system information in a wireless communication system.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

It is an aim of embodiments of the present disclosure to address shortcomings in the prior art, whether mentioned herein or not. In particular, it is an aim of embodiments of the invention to limit the necessity for and/or occurrence of blind push of SI from the network and on-demand requests from UEs.

SUMMARY

According to various embodiments of the present disclosure, a method for operating a user equipment (UE) in a wireless communication system is provided. The method includes receiving system information blocks (SIBs) of a first base station, performing a procedure for accessing a second base station that receives, from the first base station, information to be used to identify at least one SIB to be provided to the UE, and receiving the at least one SIB of the second base station.

According to various embodiments of the present disclosure, a method for operating a target base station in a wireless communication system is provided. The method includes receiving, from source base station, a message comprising information associated with system information blocks (SIBs) of the source base station, identifying at least one SIB to be provided to a user equipment (UE) based on the information, and transmitting, to the UE, the at least one SIB.

According to various embodiments of the present disclosure, there is provided a method of managing provision of system information (SI) in a telecommunication network, from the network to a user equipment (UE) the method comprising the steps of: first assistance information being exchanged between a plurality of network entities upon change and/or addition of a network node; second assistance information being provided by the network to the UE; and third assistance information being provided by the UE to the network.

Preferably, the first assistance information comprises at least one of: a minimum SI (MSI) of the source node; SI scheduling information of the source cell; indication of SI requested by the UE; and SI storage status of the UE Preferably, the step of providing the second assistance information further comprises avoiding sending redundant information to the UE as contents of the second assistance information in response to analysing the contents of the first assistance information and further comprising the step of sending a plurality of indicators to the UE.

Preferably, the method further comprises analysing the contents of the second assistance information provided by the target node and further comprising the step of sending an SI request to the target node including a list of one or more system information blocks (SIBs) determined to be re-acquired.

Preferably, the MSI of the source cell comprises a Master Information Block, MIB, and a System Information Block Type1, SIB1, and the SI scheduling information of the source node comprises SIB type and SI validity information associated with each System Information Block, SIB, such as the system information value tag and system information area identifier.

Preferably, at least one of the indication of SI requested by the UE and SI storage status of the UE is the third assistance information, provided by the UE to the source node.

Preferably, the second assistance information comprises at least one of: entire MIB and SIB1 of the target node, SI scheduling information of the target node comprising SIB type and SI validity information associated with each System Information Block, SIB, such as the system information value tag and system information area identifier and other SIBs determined to be relevant to the target node.

Preferably, the plurality of indicators sent to the UE further comprises at least one of: AcquireSIB1Ind, dedicated_Xfer_Ind and SameAsSourceCellInd.

Preferably, the AcquireSIB1Ind indicator indicates one of: the entire contents of SIB1 of the target node is provided as part of second assistance information and the UE is required to acquire SIB1 after connecting to the target node; the dedicated_Xfer_Ind indicator indicates one of: other relevant SIBs of the target cell will be provided through dedicated transfer as part of the second assistance information and the UE is required to acquire the relevant SI itself; and the SameAsSourceCellInd indicator indicates one of the one or more SIB(s) available in the target node is the same or not as the SIB(s) acquired by the UE from the source node.

Preferably, the SI storage status comprises a list of stored SIBs with the UE, each associated with one or more system information value tag and system information area identifier.

Preferably, change and/or addition of a network node t comprises one or more of the following situations: Handover from source node to target node, dual connectivity (DC) mode of operation involving addition or modification of secondary node and transition of UE in connected mode to inactive or idle mode.

Preferably, at least one of the second assistance information and the plurality of indicators is provided by means of one or more of: a radio resource control, RRC, reconfiguration message; an RRC message including entire SI Blocks; an RRC message including SI upon transition to inactive or idle such that sufficient SI is made available for cell-reselection; and an RRC message comprising SI for one or more cells the UE is expected to end up in, taking into account re-direction information and idle mode priorities.

Preferably, the method of claim 1 wherein the first assistance information is provided by means of inter-node message comprising one or more of: a Handover Preparation Information included in the Handover Request message; a secondary cell group (SCG) configuration information included in the SCG addition request message; and a SCG configuration Information included in the SCG modification request message.

Preferably, the SI request is sent by the UE to the target node by means of one or more of: an RRC message such as handover complete message; and an RRC message defined for including the SI request information.

Preferably, the third assistance information is sent by the UE to the source node by means of one or more of: a measurement report message triggered during a mobility event; a UE information response message triggered upon a UE information request message sent by the source node; and as part of a general procedure comprising unsolicited request of radio access network (RAN) information preceding the transfer of third assistance information from UE to source node.

Various embodiments of the present disclosure provide a system information transmission scheme that is more effective.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5A shows a message exchange associated with Dedicated SI transfer during handover, according to an embodiment of the invention;

FIG. 5B shows a message exchange associated with Dedicated SI transfer during handover, according to an embodiment of the invention;

FIG. 6 shows a message exchange associated with Dedicated SI transfer during handover based on stored SI status, according to an embodiment of the invention;

FIG. 7A shows a message exchange associated with Dedicated SI transfer during handover based on dedicated Xfer Indication, according to an embodiment of the invention;

FIG. 7B shows a message exchange associated with Dedicated SI transfer during handover based on dedicated Xfer Indication, according to an embodiment of the invention;

FIG. 8 shows a message exchange associated with Dedicated SI transfer during handover based on Target SI Info, according to an embodiment of the invention;

FIG. 9A shows a message exchange associated with Dedicated SI transfer after handover, according to an embodiment of the invention;

FIG. 9B shows a message exchange associated with Dedicated SI transfer after handover, according to an embodiment of the invention;

FIG. 9C shows a message exchange associated with Dedicated SI transfer after handover, according to an embodiment of the invention;

FIG. 10 shows a message exchange associated with Dedicated SI transfer during Release or Suspend, according to an embodiment of the invention;

FIG. 11 shows a message exchange associated with Assistance to avoid blind SI provision (UE info retrieval for push), according to an embodiment of the invention;

FIG. 12 shows a message exchange associated Message/procedure to request/transfer on-demand SI (pull), according to an embodiment of the invention; and FIG. 13 shows a message exchange associated with Dedicated SI transfer upon SCG cell configuration, according to an embodiment of the invention.

DETAILED DESCRIPTION

In the following, there is presented a total of 9 methods, labelled as such. These are exemplary embodiments of aspects of the invention.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a radio frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "wireless communication unit", a "wireless communication module", a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams. The backhaul communication interface 220 may be referred to as a "backhaul communication unit" or a "backhaul communication module".

The storage unit 230 stores a basic program, an application, and data such as setting information for the operation of the BS. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to exemplary embodiments of the present disclosure, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "communication unit", a "communication module", a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to exemplary embodiments of the present disclosure, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So 5th generation (5G) wireless communication system is being developed to meet the growing demand for high speed data services, support ultra-reliability and low latency applications.

The 5G wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, beamforming, massive Multiple-Input Multiple-Output (MIMO), Full Dimensional MIMO (FD-MIMO), array antenna, analog beam forming, large scale antenna techniques are being considered in the design of 5G wireless communication system. In addition, the 5G wireless communication system is expected to address different use cases having quite different requirements in terms of data rate, latency, reliability, mobility etc. However, it is expected that the design of the air-interface of the 5G wireless communication system will be flexible enough to serve UEs having quite different capabilities depending on the use case and market segment that the UE can provide to the end customer. A few example use cases that the 5G wireless communication system wireless system is expected to address include enhanced mobile broadband (eMBB), massive machine type Communication (m-MTC), ultra-reliable low latency communication (URLL) etc. The eMBB requirements such as tens of Gbps data rate, low latency, high mobility and so forth, address the market segment representing conventional wireless broadband subscribers needing internet connectivity everywhere, all the time and on the go. The m-MTC requirements such as very high connection density, infrequent data transmission, very long battery life, low mobility address and so forth address the market segment representing the Internet of Things (IoT)/ Internet of Everything (IoE) envisioning connectivity of billions of devices. The URLL requirements such as very low latency, very high reliability and variable mobility and so forth, address the market segment representing Industrial automation applications, vehicle-to-vehicle/vehicle-to-infrastructure communication, foreseen as one of the enablers for autonomous cars.

In fourth generation wireless communication systems such as LTE, enhanced node B (eNB) or base station provide cell broadcast system information. System information is structured into master information block (MIB) and a set of system information blocks (SIBs). MIB consists of System Frame Number (SFN), Downlink System bandwidth and Physical Hybrid ARQ Feedback Indicator Channel (PHICH) configuration. MIB is transmitted every 40 ms. It is repeated every 10 ms wherein the first transmission occurs in sub frame #0 when SFN mod 4 equals zero. MIB is transmitted on physical broadcast channel (PBCH). System Information Block Type 1 carries cell identity, tracking area code, cell barring information, value tag (common for all scheduling units), and scheduling information of other Ms. SIB 1 is transmitted every 80 ms in subframe #5 when SFN mod 8 equals zero. SIB 1 is repeated in subframe #5 when SFN mod 2 equals zero. SIB 1 is transmitted on Physical downlink shared channel (PDSCH). Other SIBs (SIB 2 to SIB 19) are transmitted in system information (SI) message wherein scheduling info of these SIBs are indicated in SIB 1. Further, in the LTE system during handover of UE from source eNB to target eNB, the target eNB provides, through dedicated signalling, the specific subsets of parameters of MIB, SIB1 and SIB2 of the target cell in the handover command message to the UE. The RACH configuration and physical configuration of the target cell i.e. radioResourceConfig-Common is provided to the UE in the mobilitycontrolinfo through dedicated signalling. Similarly, if the UE is operating in dual connectivity (DC) mode of operation, then the system information of the cells of the secondary eNB (SeNB) or SCG cells i.e. the RACH configuration and physical configuration of the SCG cells i.e. radioResourceConfigCommonPSCell is provided to the UE through dedicated signalling. Another scenario where the UE is provided dedicated system information is upon release with redirection, wherein the SI of candidate cells i.e. systeminformation in the CellInforGERAN and utra-BCCH-Container in the CellInfoUTRA for GERAN and UMTS respectively is provided to the UE in the RRCConnectionRelease message.

The 5G wireless communication system, i.e. New Radio (NR) system, is considering enhancements to deliver system information. In the 5G wireless communication system, system information is divided into minimum SI (MSI) and other SI (OSI). Similar to the LTE system information, the other SI can be structured into a set of SI-blocks (SIBs).

Minimum SI is periodically broadcasted. Other SI can be periodically broadcasted or provided on-demand based on UE request. The minimum SI comprises basic information required for initial access to a cell and information for acquiring any other SI broadcast periodically or provisioned via on-demand basis. The minimum SI includes at least SFN, list of PLMN, Cell ID, cell camping parameters, RACH parameters. If the network allows on demand mechanism, parameters required for requesting other SI-block(s) (if any are needed, e.g. RACH preambles for request) are also included in minimum SI. The MSI comprises of at least the MIB and SIB1 which covers the parameters similar to LTE MIB, SIB1 and SIB2.

The scheduling information in minimum SI includes an indicator which indicates whether the concerned SI-block is periodically broadcasted or provided on demand. The scheduling information for the other SI includes SIB type, validity information, SI periodicity and SI-window information. The scheduling information for the other SI is provided irrespective of whether the other SI is periodically broadcasted or not. If minimum SI indicates that a SIB is not broadcasted (i.e. it is provided on demand), then UE does not assume that this SIB is a periodically broadcasted in its SI-window at every SI period. Therefore the UE may send an SI request to receive this SIB. For other SI provided on-demand, UE can request one or more SI-block(s) or all SI-blocks in a single request.

The NR system can be deployed in standalone mode of operation (i.e. UE only connected to NR) or non-standalone mode of operation i.e. UE connected to both LTE and NR, like LTE dual connectivity, meaning the radio connection involves a master cell group (MCG) controlled by a master node (MN) and a secondary cell group (SCG) controlled by a secondary node (SN). In the standalone mode of operation the MSI is always periodically broadcasted while the OSI can be provided on an on-demand basis or periodically broadcasted depending on network implementation. For non-standalone mode of operation where the LTE eNB is master node and the NR gNB is secondary node, the system information of the cells of the secondary node or NR SCG cells involves dedicated transfer of SI upon SCG cell addition or during the SCG change. In such a scenario the network pushes the relevant SI of the NR SCG cells because the on-demand concept for requesting the relevant SI is not supported for the non-standalone mode of operation.

There are a few UE requirements for storing the acquired SI regardless of whether the mode of operation is standalone or non-standalone. The UE shall store relevant SI acquired from the currently camped/serving cell. Storing SI other than the currently camped/serving cell is up to UE implementation. The UE may store several versions of SI based on its storage capability. UE may indicate its storage capability to the network. Different from LTE, some NR SI acquired from/provided by dedicated signalling for one cell may be valid in another cell also i.e. the information may be valid in an area covered by multiple cells. Like in LTE, a version of the SI that the UE acquires and stores remains valid only for a certain time. The UE may use such a stored version of the SI e.g. after cell re-selection, upon return from out of coverage, after SI change indication or after SCG change. In typical UE implementation the SI storage management is typically referred to as garbage collection, wherein the stored information held for the longest time is typically discarded. Stored SI normally does not change during the RRC connection unless garbage collection is invoked upon reception of new SI or a validity timer associated with stored SI has expired or so called systeminfovaluetag or system-configurationindex associated with stored SI has changed.

Aspects of the present disclosure address problems in the prior art in two ways.

In order to avoid or at least limit blind push of SI from the network, the source node provides assistance to the target node and the UE provides assistance to the network.

In order to avoid or at least limit on-demand requests from the UE, the target node provides information to the UE during one of: handover event, connected to idle transition and secondary node addition or modification.

Essentially, embodiments of the invention are concerned with changes in UE connectivity to the network, including UE mobility, and the provision to, or requesting of, SI information in different scenarios. UE mobility in the context of this application refers particularly to three different scenarios:

Handover from source to target node
Dual connectivity (DC) mode—addition/modification of Secondary Node
UE transition from connected to idle/inactive mode The handover (HO) process is invoked as a UE moves and is connected to a new Base Station (gNB) as the signal from a current gNB fades and the signal from a target gNB increases in strength. HO is seamless to the user, but requires signalling between various network entities to ensure that a call is not dropped and/or data exchange is not interrupted.

In an embodiment of the invention, as a UE passes from an existing (or source) gNB to a new (or target) gNB, then the target gNB provides the necessary SI to the UE.

In DC mode, the UE is connected to a Master Node (MN) and a Secondary Node (SN). The UE requires SI from each of the MN and the SN in order to operate in such a configuration. In an embodiment of the invention, the MN provides the SI to the UE for the SN. As such, the UE is not required to take any action such as requesting the SI in an on demand manner, if and when the SN changes.

In idle mode, the UE is not actively involved in a call or data exchange and so the previously connected gNB is able to release some resources for other UEs and the UE is able to enter a lower power mode and so conserve battery life. However, since the UE is likely to be moving and will need to connect to a new gNB at some future point, it is desirable for the UE to acquire new SI as it moves through the network.

In order to achieve certain aims of embodiments of the invention, there are different means which may be employed.

In a first embodiment, the network provides information to the UE to avoid or limit on-demand requests following UE mobility.

In this embodiment, the information provided includes one or more of:
a) Dedicated transfer of SI of the target cell i.e. entire SIBs (MIB, SIB 1, . . . )
   SI required by UE is estimated based on assistance provided by other network nodes and/or by UE
   Including validity information of the SI (i.e. index/area+value tag)
b) target SI info i.e. indication of the (relevant) SI valid in the target cell, comprising of the list of SIBs with, for each, the index or area & value tag
c) entire SIB 1 of the target cell, or part of SIB1 (i.e. SI scheduling/validity info) and a field indicating that the UE is to acquire SIB 1 after handover completion
d) Indication whether UE should acquire SI by itself or whether the UE can expect the network to provide by dedicated transfer
e) a field indicating that (some or relevant) SI of the target cell is same as broadcast by the source cell The information a) to e) above may be provided by one or more of the following mechanisms:
f) The Network provides the SI in a (LTE/NR) reconfiguration message e.g. a message commanding mobility to another node (e.g. HO command, change of MN, or change of SN).
g) The message includes entire SIBs e.g. the subset relevant for the UE, and possibly by means of SI messages
h) The network provides SI upon transition to idle or inactive i.e. covering the information required for cell re-selection
i) The network provides SI for cells the UE is expected to end up in, taking into account redirection info and idle mode priorities The UE uses these indications to determine whether to trigger on-demand SI requests upon HO completion.

In order for the network to make an informed decision, the UE may provide assistance with the provision of SI. In this case, SI is stored by the UE. This comprises SI storage status, comprising of the list of stored SIBs with, for each, the one or more index or area & value tag (if multiple versions are stored).

This information may be provided within a MeasurementReport message e.g. related to a measurement typically used by network to trigger mobility or for which the network configured the UE to provide the info. It may be additionally or alternatively provided upon connection establishment, in response to a request from the network, or by using a general procedure for transferring information from UE to network i.e. covering both request/response as well as unsolicited (i.e. sequence of RANInformationRequest/RANInformation).

It is further possible to transfer SI related information between network nodes. This may require knowledge of one or more of:
the minimum SI of the source cell (MIB, SIB 1) to allow delta signalling to occur;
SI validity info i.e. of each SIB provided by source (PCell), an index/value tag (i.e. may be in MSI);
Indication of SI required by UE (as previously requested by the UE, may be in AS-Context);
SI storage status, which may, inter alia, be based on information previously received from UE;
Additionally, SI information may be transferred between nodes upon change of MN (i.e. from source to target MN upon handover) and/or upon addition/change of SN (i.e. SCG cell configuration).

Dedicated SI Transfer Upon Mobility/State Transition (Network Push)

In an NR system, the network should be able to provide SI required in connected upon the same UE mobility cases as in LTE (change of PCell, SCell addition). In addition, it may be beneficial for the network to provide the UE with SI required in idle/inactive upon moving the UE to such states.

TABLE 1

| Case | Items required | Notes |
|---|---|---|
| UE mobility in connected Change of PCell, addition/ change of SCells | (Parameters from MSI) MIB and SIB1 | Concerns both for SIBs that may be provided on-demand and broadcast only SIBs |
| Transition to idle/ inactive | Parameters from SIB3- SIB8, depending on UE capability | Beneficial both for SIBs that may be provided on-emand and broadcast only SIBs |

In case only essential parts of MSI are provided (some parameters of MIB and SIB1), during PCell mobility i.e. handover, the UE may subsequently still issue an on-demand request to obtain the missing parts or may obtain them by reading the MIB and SIB1 after the handover is completed. It may be preferable to always transfer entire MIB (except SFN) and SIB1. This furthermore avoids the tedious efforts to determine the essential fields (i.e. fields urgently required upon UE mobility). It is desirable to introduce support of dedicated transfer of SI to the reconfiguration message, so it may be provided in the same message commanding UE mobility or transition to UE controlled mobility state i.e. to the NR reconfiguration message like the handover command message or connection release message.

In particular for the case of transition to UE controlled mobility state i.e. IDLE or INACTIVE state, it may be difficult to fit all SIBs in a single (reconfiguration) message. It should be noted that a UE in idle/inactive state requires the SIBs including cell re-selection parameters (as provided by SIB3-SIB8 in LTE). As the information does not really affect success of the reconfiguration, it should however be possible for the network to transfer such SI by one or more separate messages prior to commanding UE mobility state transition. In embodiments of the present disclosure, a system and method for dedicated transfer of entire system information block(s) i.e. SIB(s) and associated systeminfovaluetag or systemconfigurationindex is presented.

Method 1: Dedicated SI Transfer During Handover

In standalone mode, during the handover from source gNB to target gNB, the source gNB provides the MSI of the source cell to the target cell during the HO preparation with the target gNB in the HandoverPreparationInformation kind of message. The MSI includes the scheduling information comprising SIB type, validity information, i.e., systeminfovaluetag or systemconfigurationindex and/or systeminformationareaidentifier associated with the SIBs, periodicity, and SI-window information, and the scheduling information may be included in the HandoverPreparationInformation message. The HandoverPreparationInformation includes at least the as-Config, rrm-Config, ue-RadioAccessCapability-Info, as-Context as in LTE. The as-Context includes the information included in the SI request message sent by the UE to the source cell. Based on source scheduling information, the target gNB determines the systeminformationareaidentifier and the systeminfovaluetag or systemconfigurationindex associated with the SIBs available in the source cell and based on the as-Context related to SI request, the target gNB determines which SIBs the UE is interested in and which have already been acquired and stored. Based on this information, if some SIBs available in the target cell are same as those provided in the source cell, then the UE is not provided those SIBs which is redundant information, because the UE already has those SIB s in the stored information. The target gNB cannot determine all the SI versions stored by the UE but only the relevant SIBs available in the source cell. However, if some SIB(s) available in the target cell is different from those provided in the source cell, then the UE is provided with those SIBs through dedicated transfer of SI, which is pushed by the network when the UE successfully completes handover to target i.e. upon successful completion of the random access in the target cell as shown in FIG. 5A.

Since the dedicated transfer of SI is pushed by the network, there is no need for the UE to make the on-demand request of SI. Similar to LTE, during the handover of UE from the source gNB to the target gNB, the target gNB instead of providing specific subsets of parameters of MIB and SIB1 of the target cell, the entire contents of MIB (except SFN) and SIB1 is provided in the handover command message to the UE. The MIB includes the parameters indicating the SIB1 scheduling and the SIB1 includes common RACH configuration, the dedicated RACH configuration, PLMN list, and physical configuration of the target cell, i.e., radioResourceConfigCommon is provided to the UE in the mobilitycontrolinformation through dedicated signaling as shown in FIG. 5A. The mobilitycontrolinformation also includes the scheduling information of other SIB(s) in the target cell wherein the systeminformationareaidentifie and the systeminfovaluetag or systemconfigurationindex associated with the SIBs available in the target cell is included. In the present disclosure, the option to transfer complete MSI, i.e., MIB (except SFN) and SIB1 by means of the handover command message is introduced. However, in future releases if there are extensions to SIB1 then it may not be possible to include the entire SIB1 in handover command message. The target gNB includes an indication to indicate the UE whether the entire SIB1 is included in the mobilitycontrolinformation; this indication is referred as AcquireSIB1Ind as shown in FIG. 5B. For example, if the AcquireSIB1Ind is set as FALSE, it means that the target gNB has included the entire SIB1 and there is no need for the UE to re-acquire the SIB1 after completing the handover with the target cell. If the AcquireSIB1Ind is set as TRUE means the target gNB has included some parameters of SIB1 and not the entire SIB1 in the handover command message and hence the UE is required to re-acquire the SIB1 after completing the handover with the target cell.

Method 2: Dedicated SI Transfer During Handover Based on Stored SI Status

In the standalone mode, during the handover triggering procedure the UE sends the measurement report comprising the RRM measurements for cell quality and beam measurements. In addition, the UE includes the status of stored SI in the measurement report as shown in FIG. 6. The stored SI status information comprises the SIB type, the validity information, i.e., systeminfovaluetag or systemconfigurationindex and/or systeminformationareaidentifier associated with the SIBs. For certain SIB types, there may be several versions stored and this is differentiated based on the systemconfigurationindex and systeminformationareaidentifier. The source gNB on receiving the stored SI status information in the measurement report forwards this information along with the HandoverPreparationInformation to the target gNB as shown in FIG. 6. Based on the stored SI status information, the target gNB can determine all the SI versions stored by the UE. If some SIB(s) available in the target cell is different from those stored by the UE, then the target gNB provides those SIBs through dedicated transfer of SI, which is pushed by the network when the UE successfully completes handover to target i.e. upon successful completion of the random access in the target cell Method 3: Dedicated SI Transfer During Handover Based on Dedicated Xfer Indication The mobilitycontrolinformation may include either the entire SIB1 or some parameters of the SIB1 which is indicated by the AcquireSIB1Ind. In addition, there can be dedicated_Xfer_Ind in the mobilitycontrolinformation which indicates to the UE that the UE is neither required to acquire the on-demand SIBs from broadcast nor trigger the SI request after successfully completing the handover with the target cell as shown in FIG. 7A. With the reception of dedicated_Xfer_Ind in the handover command message, the UE determines the target gNB provides the SIB(s) available in the target cell through dedicated transfer of SI. The provided SIB(s) may be different from those stored by the UE. Alternatively, as shown in FIG. 7B, the target gNB can include the SameAsSourceCellInd in the mobilitycontrolinformation which indicates to the UE that the SIB(s) available in the target cell is same as the SIB(s) acquired by the UE from the source cell. With the reception of SameAsSourceCellInd in the handover command message the UE determines it is neither required to acquire the on-demand SIBs from broadcast nor trigger the SI request after successfully completing the handover with the target cell. The UE applies the stored SI acquired from the source cell in the target cell.

Method 4: Dedicated SI Transfer During Handover Based on Target SI Info

The mobilitycontrolinformation may include either the entire SIB1 or some parameters of the SIB1 which is indicated by the AcquireSIB1Ind. When the entire SIB1 is included in handover command message then the mobilitycontrolinformation indicates information about the target SI available in the target cell. However, when the entire SIB1 is not included then it is mandatory to include the Target SI Info as shown in FIG. 8. The Target SI Info comprises the scheduling information of other SIB(s) in the target cell wherein the systeminformationareaidentifier and the systeminfovaluetag or systemconfigurationindex associated with the SIB(s) available in the target cell is included. Based on the Target SI Info, the UE determines if the stored SI acquired from source cell can be reused in the target cell or there is need to re-acquire some SIB(s) of the target which are different from the stored SIB(s). The UE can re-acquire those SIB(s) either through broadcast or by triggering a SI request.

Method 5: Dedicated SI Transfer after Handover

The Target SI Info comprises the scheduling information of other SIB(s) in the target cell wherein the systeminformationareaidentifier and the systeminfovaluetag or systemconfigurationindex associated with the SIB(s) available in the target cell is included. The dedicated_Xfer_Ind indicates to the UE that the UE is neither required to acquire the on-demand SIBs from broadcast nor trigger the SI request after successfully completing the handover with the target cell as shown in FIG. 9A and FIG. 9B. However, if the dedicated_Xfer_Ind indication is set to FALSE meaning that the UE either needs to re-acquire SIB(s) from broadcast or trigger a SI request. Based on Target SI Info, the UE determines if the stored SI acquired from source cell can be reused in the target cell or there is need to re-acquire some SIB(s) of the target which are different from the stored SIB(s). As an optimization, the UE indicates the required SIB(s), i.e., TargetSINeededInd in the handover complete message as shown in FIG. 9A. Alternately, this can be indicated in the handover complete message with a list of one or more SIB(s) that the UE needs from the target as shown in FIG. 9B. In another realization as shown in FIG. 9C, the mobilitycontrolinformation neither includes the dedicated_Xfer_Ind indicator nor the Target SI Info. However, the mobilitycontrolinformation includes the entire SIB1 of the target cell. Since the SIB1 comprises the scheduling information of other SIB(s) in the target cell wherein based on the systeminformationareaidentifier and the systeminfovaluetag or systemconfigurationindex associated with the SIB(s) the UE determines which SIB(s) it needs to acquire from the target cell. The UE includes the required SIB(s) i.e. TargetSINeededInd in the handover complete message as shown in FIG. 9C.

Method 6: Dedicated SI Transfer During Release or Suspend

Assuming that the broadcast-only SIBs i.e. MIB and SIB1 can always fit in the reconfiguration message (as in LTE), it seems possible to use the normal message/procedure for transfer of on-demand SI (OSI), i.e., no need to add support for transfer of broadcast only SI by the on-demand message/procedure. Further, the transfer of complete SIBs (in particular on-demand SIBs) by means of connection reconfiguration message is supported as shown in FIG. 10. In case not all SIBs fit in the reconfiguration message, NR RAN can transfer the on-demand SIBs separately prior to the reconfiguration by the normal message/procedure for transfer of on-demand SI (i.e. the broadcast-only SIBs should always fit in the release message) as shown in FIG. 10. UE is provided dedicated system information upon release to either IDLE state or suspend to INACTIVE state wherein the SI of candidate cells, i.e., CellInfoEUTRA and/or broadcast only SI of candidate NR cells, i.e., CellInfoNR for EUTRAN and NR respectively is provided to the UE in the RRCConnectionRelease message as shown in FIG. 10. The CellInfoEUTRA is RRC container for system information of the EUTRAN cell i.e. one or more System Information (SI) messages as defined in TS 36.331. The CellInfoNR is RRC container for MSI i.e. MIB (except SFN) and SIB1 of the NR cell as defined in TS 38.331. The on-demand SI in the reconfiguration message includes SIBs of the NR cell i.e. one or more System Information (SI) messages as defined in TS 38.331.

Method 7: Assistance to Avoid Blind SI Provision (UE Info Retrieval for Push)

In case the UE request SIBs in an on-demand fashion (UE pull), RAN should only provide version of the SIB that is currently used in the serving cell. RAN should never provide (versions of) SIBs that the UE has stored. In the cases discussed in the previous section (network push), the RAN would blindly provide SIBs related to UE controlled mobility that are relevant in the current area of the UE. As a result, several SIBs provided by the RAN may be transferred uselessly. Some ways to avoided this would be as follows:

1. During handover preparation, the source gNB informs the target gNB of the SIBs available in the source gNB and associated systemInfoValueTag or systemconfigurationindex and/or systeminformationareaidentifier.
2. During handover preparation, the source gNB informs the target gNB of all the versions of SIBs stored by the UE i.e systemInfoValueTag or systemconfigurationindex and/or systeminformationareaidentifier for each version is provided to the target as Stored SI status.
3. Upon connection establishment, the UE provides information regarding the SIBs it has stored i.e. systemInfoValueTag or systemconfigurationindex and/or systeminformationareaidentifier for each version is provided.

4. Introduce a procedure by which the network can retrieve the information regarding which SIBs (including versions) the UE has stored.

All above options seem feasible and hence should be introduced, if there is a real need to avoid useless transfer of SIBs (versions) already stored by the UE. If it is desirable to introduce a procedure by which the network can retrieve the information regarding which SIBs (including versions) the UE has stored then the procedure is depicted in FIG. 11.

The entire message sequence that may result could look as illustrated by the FIG. 11, wherein after connection establishment the RAN sends the UEInformationRequest message to retrieve the information regarding the SIB(s) the UE has stored. The UE responds to the network request with the UEInformationResponse message which includes all the versions of SIBs stored by the UE i.e systemInfoValueTag or systemconfigurationindex and/or systeminformationareaidentifier for each version of SIB is provided to the network in the response message. The UEInformationResponse message shown in FIG. 11 is one example as part of the network retrieval procedure. The UEInformationResponse message to indicate the SI (versions) stored by the UE can also be realized in a UE autonomous manner wherein the a) the UE autonomously provide storage information after connection establishment; b) the UE may autonomously provide information in Measurement Report or can be configured to provide the storage information by the measurement configuration c) the UE may autonomously provide storage information in handover complete message or d) the UE may autonomously provide storage information after handover complete.

Method 8: Message/Procedure to Request/Transfer On-Demand SI (Pull)

It would be good to create a message/procedure that may be used for requesting other information from RAN also i.e. a general RAN information retrieval message/procedure as shown in FIG. 12. As the RAN information response message may also be sent unsolicited i.e. sent without prior request from the UE (e.g. as in the block illustrating on-demand SI provision in FIG. 11), a name not including response seems preferable (i.e. RANInformation).

The entire message sequence that may result could look as illustrated by the FIG. 12, wherein after connection establishment the UE sends the RANInformationRequest message in unsolicited manner to retrieve the information regarding the SIB(s) available in the serving cell. The RAN responds to the UE request with the RANInformation message which includes the information on all the SIBs available in the serving cell. The RANInformation message comprises the scheduling information of the available SIB(s) in the serving cell wherein the systeminformationareaidentifier and the systeminfovaluetag or systemconfigurationindex associated with the SIB(s) available in the serving cell is included.

In the present disclosure, the support for on demand request of SIBs in connected by means of generic UE initiated RAN information retrieval messages/procedure is introduced.

Method 9: Dedicated SI Transfer Upon SCG Cell Configuration

In the non-standalone mode, the network provides by dedicated signaling the NR SI required in connected, at least the parameters essential for cells of the secondary cell group (SCG) e.g. the PSCell. Alike for the case of handover, the network may not provide the subset of parameters that are essential for the UE to operate on the concerned SCell but the complete SIBs together with the validity information (systeminfovaluetag or systemconfigurationindex and/or systeminformationareaidentifier) so the UE can store the SIBs for use in other cells using the same version of the concerned SIB.

In case of non-standalone mode, the LTE master node (MN) provides the SI of the NR SCG cells to the UE, at least upon establishment of the secondary cell group (SCG). It is the NR secondary node (SN) that provides the SI of the concerned cells to the LTE master node, that transparently forwards the information (alike done for other SCG configuration parameters). In particular, the SN may provide the SCG configuration information in an NR reconfiguration message that LTE MN encapsulates in an LTE reconfiguration message towards the UE. Upon SCG establishment, the LTE SN is assume to blindly push the required SIB as it is unaware of which SI (versions) the UE has stored. The LTE MN could in principle assist i.e. by retrieving the stored NR SI status from the UE prior to SCG establishment and by providing such information to the SN upon SCG establishment. This however seems more appropriate for the case of NR dual connectivity, as for the NR MN there in general seems use in retrieving such stored SI status information from the UE.

After SCG establishment, the NR secondary node typically initiates addition for further SCG cells, either signaling the information to the UE via the LTE master node or directly via the SCG connection. For the NR SN is seems useful to avoid having to blindly push NR SI for all SCG it subsequently adds i.e. it seems beneficial for SN to know the stored NR SI status. If this information is not provided by MN upon SCG establishment, the SN can (e.g. upon completing SCG establishment) apply the procedure to retrieve stored SI status from the UE. Based on this information, when further SCG cells are added, the SN can avoid to provide the SIB versions the UE already has stored.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE) in a wireless communication system, the method comprising:
   receiving, from a source base station, a handover command message including system information block 1 (SIB 1) of a target base station, wherein the SIB 1 of the target base station includes scheduling information of one or more other SIBs, and the scheduling information includes a value tag associated with a version of the one or more other SIBs and identification (ID) information on a system information area;
   identifying whether a condition that the version of the one or more other SIBs and the ID information on the system information area is stored in the UE is satisfied or not; and
   based on the condition is not satisfied, transmitting, to the target base station, a request message including information indicating the one or more other SIBs.

2. The method of claim 1, further comprising:
   performing a procedure for accessing the target base station that receives, from the source base station, information to be used to identify at least one SIB to be provided to the UE,
   wherein the performing the procedure comprises:
   receiving a message comprising at least part of a SIB of a minimum system information (MSI) and an indication of whether entire of the SIB of the MSI is included or not.

3. The method of claim 2, wherein the information to be used to identify at least one SIB to be transmitted to the UE comprises at least one of:
   information regarding scheduling of the at least one SIB of the source base station,
   information included in system information (SI) request sent by the UE to the source base station, or
   information regarding a status of SI stored in the UE.

4. The method of claim 2, wherein the performing the procedure comprises:
   receiving a message comprising at least one of:
   a first indication of whether the target base station provides the at least one SIB by dedicated transfer,
   a second indication of whether the one or more SIBs of the source base station is available in a cell of the target base station,
   information regarding scheduling of the at least one SIB of the target base station, or
   the at least one SIB of the target base station.

5. The method of claim 1, further comprising:
   transmitting, to the source base station, information regarding a status of SI stored in the UE.

6. The method of claim 1, further comprising:
   receiving, from the target base station, a message for releasing a connection with the target base station to enter an idle mode or an inactive mode,
   wherein the message comprises SI of at least one candidate cell.

7. The method of claim 1, further comprising:
   receiving, from the target base station, a first message for retrieving the information regarding SIBs stored in the UE; and
   transmitting, to the target base station, a second message for informing of versions of the SIBs stored in the UE.

8. The method of claim 1, further comprising:
   transmitting, to the target base station, a first message for retrieving the information regarding SIBs available in the target base station; and
   receiving, from the target base station, a second message comprising information regarding the SIBs available in the target base station.

9. The method of claim 1, wherein the scheduling information is used to acquire the SIB 1.

10. The method of claim 1, wherein the ID information includes information indicating a system information area which a cell belongs.

11. A user equipment (UE), comprising:
    a communication interface; and
    a controller configured to:
    receive, from a source base station, a handover command message including system information block 1 (SIB 1) of a target base station, wherein the SIB 1 of the target base station includes scheduling information of one or more other SIBs, and the scheduling information includes a value tag associated with a version of the one or more other SIBs and identification (ID) information on a system information area;
    identify a condition that whether the version of the one or more other SIBs and the ID information on the system information area is stored in the UE or not; and
    based on the condition is not satisfied, transmit, to the target base station, a request message including information indicating the one or more other SIBs.

12. The UE of claim 11,
    wherein the controller is further configured to perform a procedure for accessing the target base station that receives, from the source base station, information to be used to identify at least one SIB to be provided to the UE, and
    wherein to perform the procedure, the controller is configured to control the communication interface to receive a message comprising at least part of a SIB of a minimum system information (MSI) and an indication of whether entire of the SIB of the MSI is included or not.

13. The UE of claim 11, wherein the scheduling information is used to acquire the SIB 1.

14. The UE of claim 11, wherein the ID information includes information indicating a system information area which a cell belongs.

\* \* \* \* \*